United States Patent
Tsai (10) Patent No.: US 7,585,121 B2
(45) Date of Patent: Sep. 8, 2009

(54) CAMERA MODULE AND ELECTRONIC DEVICE INCORPORATING THE SAME

(75) Inventor: Kun-Jung Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 342 days.

(21) Appl. No.: 11/309,462

(22) Filed: Aug. 10, 2006

(65) Prior Publication Data

US 2007/0116454 A1    May 24, 2007

(30) Foreign Application Priority Data

Nov. 18, 2005    (TW) .................................. 94140616

(51) Int. Cl.
*G03B 15/00*    (2006.01)
(52) U.S. Cl. ..................... 396/351; 396/376; 396/429
(58) Field of Classification Search ................ 359/367, 359/726; 396/71, 84, 148, 351, 376, 530, 396/535, 544, 429; 348/333.06, 369; 455/575.1
See application file for complete search history.

(56) References Cited

U.S. PATENT DOCUMENTS

| | | | | |
|---|---|---|---|---|
| 3,891,795 | A * | 6/1975 | Johnson et al. | 348/143 |
| 4,058,831 | A * | 11/1977 | Smith | 348/37 |
| 6,992,699 | B1 * | 1/2006 | Vance et al. | 348/207.99 |
| 7,003,318 | B2 | 2/2006 | Kota et al. | |
| 2001/0006400 | A1 * | 7/2001 | Kubo et al. | 348/233 |
| 2002/0080256 | A1 * | 6/2002 | Bates et al. | 348/335 |

* cited by examiner

*Primary Examiner*—Christopher E Mahoney
*Assistant Examiner*—Leon W Rhodes
(74) *Attorney, Agent, or Firm*—Frank R. Niranjan (57) ABSTRACT

A camera module includes a body having a front face and a back face opposite to the front face, a display screen disposed on the front face of the body, a camera lens provided on the back face of the body, a through window defined in the body, and a turn member rotatably mounted on the back face of the body. The turn member includes a reflection mechanism configured for reflecting light incident from the window onto the camera lens while the turn member is turned to a predetermined position.

20 Claims, 7 Drawing Sheets

CAMERA MODULE AND ELECTRONIC DEVICE INCORPORATING THE SAME

FIELD OF THE INVENTION

The present invention relates to digital cameras and, more particularly, to a camera module and an electronic device incorporating the camera module.

DESCRIPTION OF RELATED ART

Currently, digital cameras are in widespread use in a variety of portable electronic devices such as mobile phones or personal digital assistants (PDAs). Most portable electronic devices are becoming progressively more miniaturized over time, and digital cameras are correspondingly becoming compact and smaller. In general, the small digital camera is integrally mounted at a portion of a body of a portable electronic device.

Typically, many digital cameras are fixed to the rear of the display screen facing outwards and thus can only photograph an object in the rear of the display screen. That is, an object in front of the display screen, for example, a user facing towards the display screen (for example, a user using the device for tele-conferencing), cannot be pictured. In order to photograph himself/herself, the user needs to face towards the lens of the digital camera and thus cannot see the display screen.

In order to overcome the shortcomings set out above, a rotatable digital camera is provided. For example, in a mobile phone, the rotatable digital camera is typically installed at a rotation axis of a hinge of the mobile phone and can rotate along the rotation axis of the hinge. In this construction, the rotatable digital camera can photograph an object to the front or back of a display screen of the mobile phone while being manually rotated by a user. Nevertheless, this kind of digital camera requires a relatively complicated mechanism for installing and rotating the digital camera along the rotation axis of the hinge. For this digital camera to be accommodated into an electronic device, there would have to be an undesirable increase in both technological complexity and manufacturing cost.

What is needed, therefore, is a camera module that has a simple mechanism.

What is needed, therefore, is an electronic device having a camera module with a simple mechanism.

SUMMARY OF INVENTION

In accordance with a preferred embodiment, a camera module includes a body having a front face and a back face located opposite to the front face, a display screen disposed at the front face of the body, a camera lens provided on the back face of the body, a through window defined in the body, and a turn member rotatably mounted on the back face of the body. The turn member includes a reflection mechanism configured for reflecting light incident from the window onto the camera lens while the turn member is turned to a predetermined position.

Other advantages and novel features will be drawn from the following detailed description of preferred embodiments in conjunction with the attached drawings, in which:

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module. Moreover, in the drawings, like reference numerals designate corresponding parts throughout the several views.

DETAILED DESCRIPTION

Embodiments of the present invention will now be described in detail below and with reference to the drawings.

Figure 1:
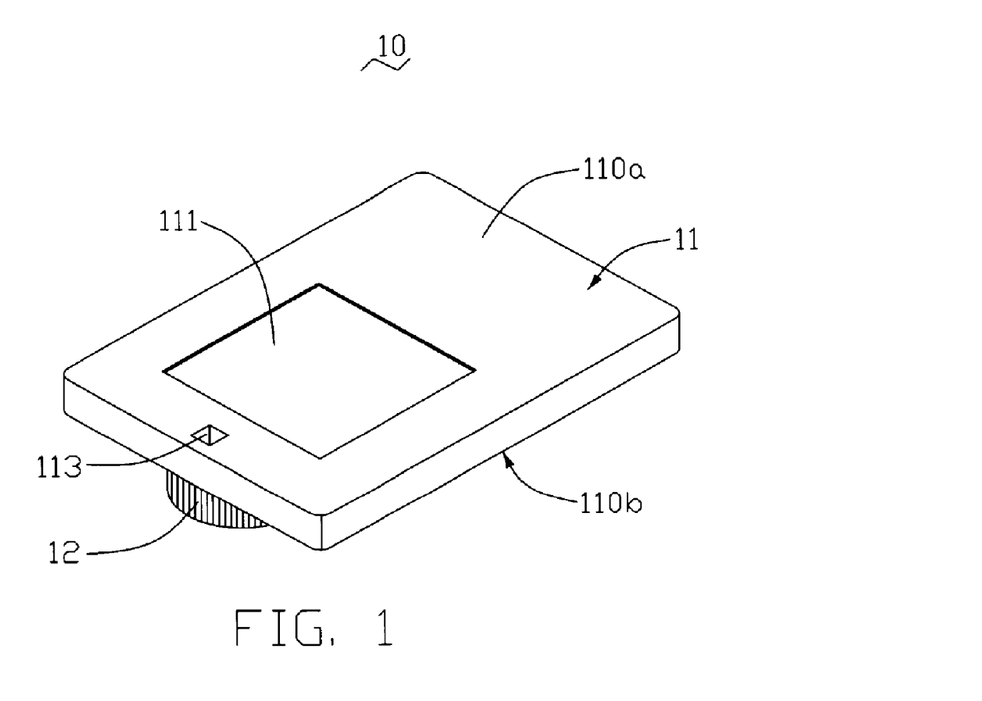
FIG. 1 is a schematic, isometric view of a camera module according to a preferred embodiment.
Figure 2:
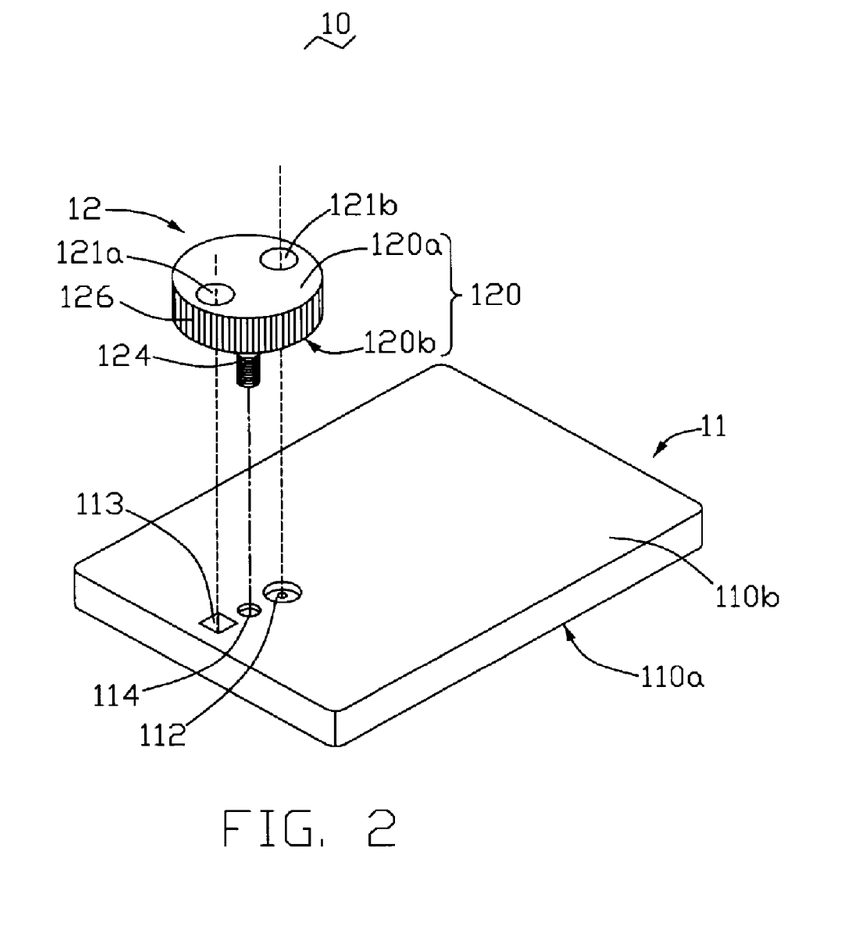
FIG. 2 is a schematic, isometric, exploded view of the camera module of FIG. 1.

FIGS. 1 and 2 illustrates a camera module 10 in accordance with a first preferred embodiment. The camera module 10 mainly includes a body 11 and a turn member 12 rotatably mounted on the body 11. The body 11 has a front face 110a and a back face 110b opposite to the front face 110a. A display screen 11 is disposed on the front face 110a. The back face 110b of the body 11 is equipped with a camera lens 112. The body 11 defines a through window 113, for allowing light to travel from a side of the body 11 to another opposite side of the body 11.

The turn member 12 has a rotation shaft 124 for rotatably mounting the turn member 12 on the body 11. For example, the rotation shaft 124 has outer screw threads. The body 11 defines a receiving portion 114 having inner screw threads for engaging with the outer screw threads of the rotation shaft 124 so that the rotation shaft 124 can be screwed into the body 11. The turn member 12 symmetrically defines two openings 121a and 121b. The two openings 121a and 121b may be cuboid chambers. A center of the camera lens 112 and a center of the window 113 may be symmetrically positioned relative to a rotation axis of the rotation shaft 124. The two openings 121a and 121b can be positioned symmetrically with each other relative to the rotation axis of the rotation shaft 124 in accordance with the positioning of the window 113 and the camera lens 112, respectively, while the turn member 12 is turned to a certain angle, as shown in FIG. 2. In this position, the two openings 121a and 121b are coaxially aligned with the window 113 and the camera lens 112, respectively. The window 113 and the camera lens 112 in a cross-sectional direction have no dimensions larger than cross-sectional dimensions of the two openings 121a and 121b, respectively. In other words, the window 113 and the camera lens 112 are of a dimension such that they can be inserted wholly into the two openings 121a and 121b, respectively.

Figure 3:
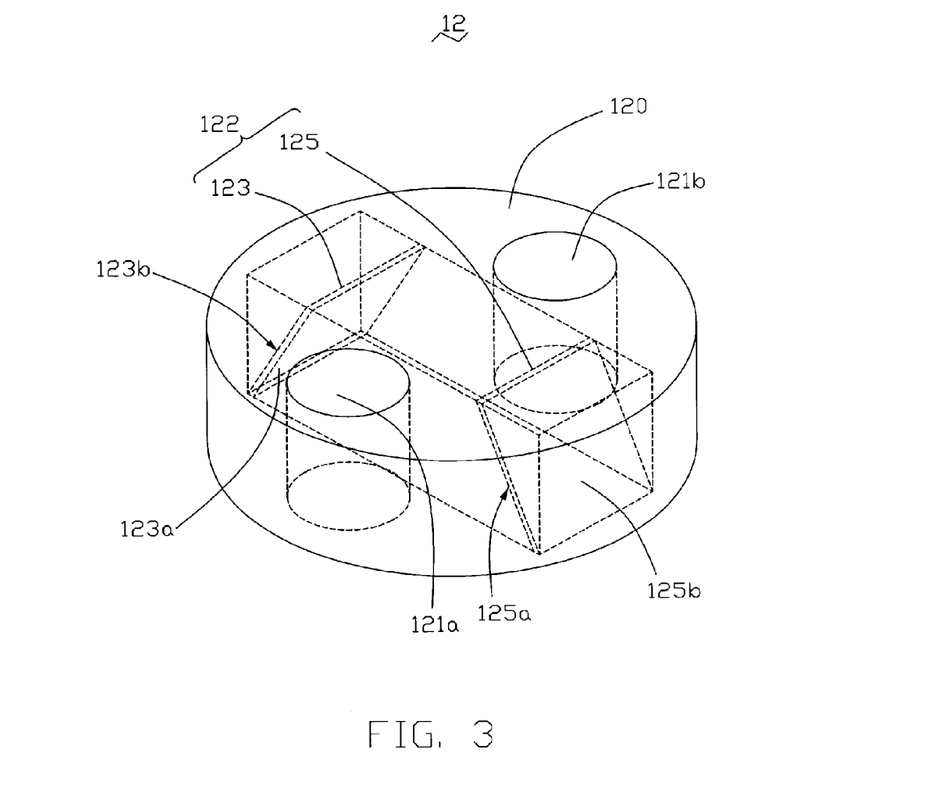
FIG. 3 is a schematic, isometric view of a turn member of the camera module of FIG. 1, showing inner structure of the turn member.

Referring to FIGS. 2 and 3, the turn member 12 includes a base 120 and a reflection mechanism 122 disposed in the base 120. The base 120 has a backside 120a and a front side 120b essentially parallel to the back face 110b. The base 120 of the turn member 12 may be made of transparent material such as glass or silicon dioxide. The base 120 of the turn member 12 may have a circular cross section essentially perpendicular to the rotation shaft 124. A number of slip-proof grooves 126 are defined on a peripheral circumferential surface of the base 120, for readily holding the turn member 12 without slipping. Alternatively, the cross section of the base 120 could be in a polygon form, for example, hexagon, thereby readily turning the turn member 12 by gripping the polygonal edges.

The reflection mechanism 122 includes two reflectors 123 and 125. The two reflectors 123 and 125 are positioned symmetrically opposite to each other across the rotation shaft 124. The two reflectors 123 and 125 and the two openings 121a and 121b may be disposed at four centrosymmetric positions of the base 120. The two reflectors 123 and 125 each are inclined to the backside 120a and front side 120b of the base 120 at a predetermined angle. The reflector 123 has a reflective surface 123a and a non-reflective surface 123b. The reflector 125 has a reflective surface 125a and a non-reflective surface 125b. The reflective surface 123a and the reflective surface 125a are opposite to each other and orientated in a manner such that light incident through the window 113 is reflected from one of the reflective surfaces 123a, 125a to the other. Accordingly, incident light from the bottommost area of the base 120 will be reflected toward the camera lens 112 via the two reflective surfaces 123a and 125a.

Two reflective films (not shown), for example, silver or aluminum metal films, may be optionally coated on the two non-reflective surfaces 123b and 125b, respectively, for enhancing reflection of the two reflectors 123 and 125. Likewise, a reflective film can be optionally coated on the backside 120a of the base 120, for preventing light from escaping out of the backside 120a of the base 120.

Figure 4:
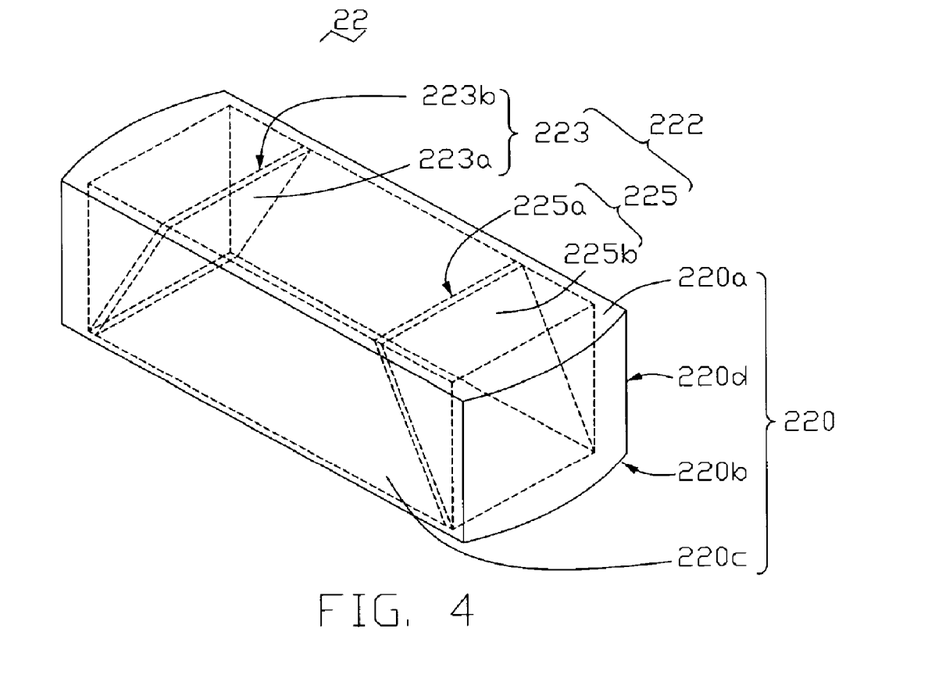
FIG. 4 is a schematic, isometric view of an alternative turn member of the camera module of FIG. 1.

FIG. 4 illustrates an alternative turn member 22 for the camera module 10. The turn member 22 is essentially similar to the turn member 12 except of the base 220. The turn member 22 includes a reflection mechanism 222 essentially similar to the reflection mechanism 122. The reflection mechanism 222 includes two reflectors 223/225 having a reflective surface 223a/225a and a non-reflective surface 223b/225b, respectively. The base 220 has a compact contour configured for freely incorporating the reflection mechanism 222 therein. The base 220 has an upper surface 220a, an under surface 220b, two elongated side surfaces 220c and 220d. The two elongated side surfaces 220c and 220d are orientated perpendicular to the two reflective surfaces 223a and 225a of the two reflectors 223 and 225. The two elongated side surfaces 220c and 220d have a small distance offset from the reflection mechanism 122. A distance between the two side surfaces 220a and 220b is smaller than a closest distance between the window 113 and the camera lens 112 (see FIG. 2). Thus, in a first shooting mode at which the two side surfaces 220c and 220d is turned to be perpendicular to an imaginary line connecting the camera lens 112 and the window 113, light from the back face 110b of the body 11 can directly enter into the camera lens 112. In a second shooting mode at which the two side surfaces 220c and 220d is turned to be parallel to an imaginary line connecting the camera lens 112 and the window 113, light from the front face 110b of the body 11 can be reflected to the camera lens 112 via the reflection mechanism 222. A reflective film (not shown) may optionally be coated onto the upside 220a of the base 220. The base 220 of the turn member 22 may be made of transparent material such as glass or silicon dioxide.

Figure 5:
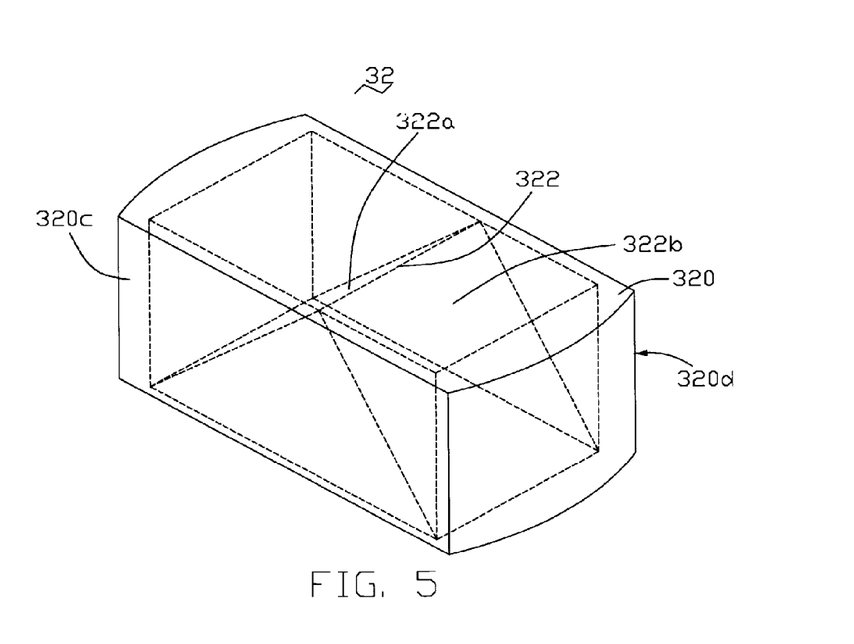
FIG. 5 is a schematic, isometric view of another alternative turn member of the camera module of FIG. 1.

FIG. 5 illustrates another alternative turn member 32 for the camera module 10. The turn member 32 includes a base 320 and a reflection mechanism 322. The base 320 is essentially similar to the base 220 in terms of, for example, structure, material, etc. The reflection mechanism 322 is a prism disposed in the base 320. The prism may be an isosceles orthogonal prism. The prism may be made of transparent material such as glass or silicon dioxide. The reflection mechanism 322 in the form of a prism has two adjacent sloped surfaces 322a and 322b. The two sloped surfaces 322a and 322b may be perpendicular to each other and covered with a reflective film respectively, for reflecting light incident from the front face 110a of the body 11. That is, the two sloped surfaces 322a and 322b are two reflective surfaces, opposite to each other, and are oblique with respect to the back face 110a of the body 11. In a first shooting mode at which the turn member 32 is turned to be perpendicular to an imaginary line connecting the camera lens 112 and the window 113, light from the back face 110b of the body 11 can directly enter the camera lens 112. In a second shooting mode at which the turn member 32 is turned to cause the two sloped surfaces 322a and 322b to face toward the window 113 and the camera lens 112, light from the front face 110b of the body 11 can be reflected to the camera lens 112 via the two sloped surfaces 322a and 322b with reflective films. Also, the reflection mechanism 322 can instead be a frustum of a prism.

Figure 6:
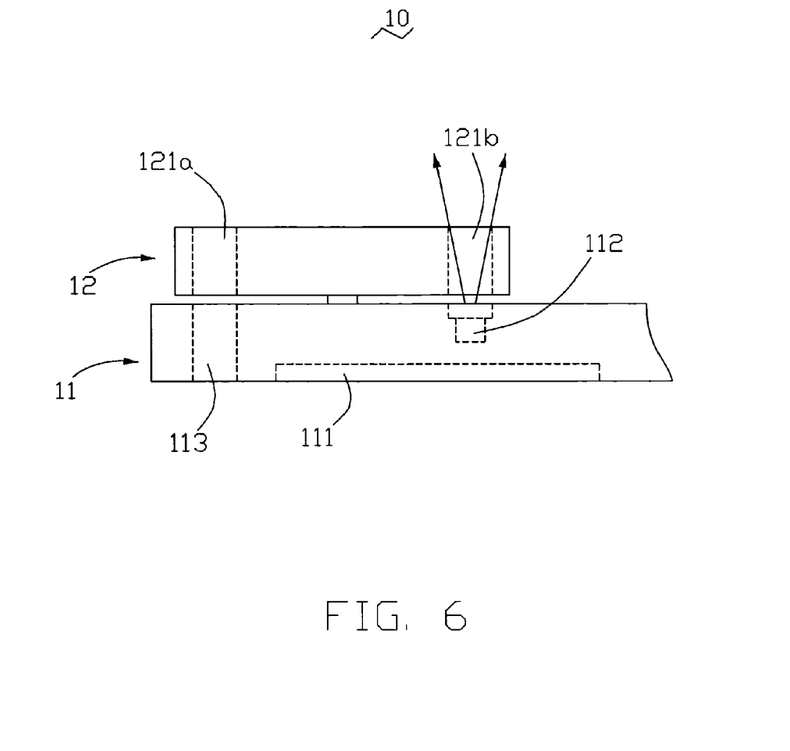
FIG. 6 is a schematic, side view of the camera module of FIG. 1, showing the camera module in a first shooting mode.

FIG. 6 illustrates the camera module 10 employing the turn member 12 in the first shooting mode. In the first shooting mode, i.e., a mode for shooting view on the back face 110b of the body 11, the turn member 12 is turned to a certain angle so that the two openings 121a and 121b are coaxially aligned with the window 113 and the camera lens 112, respectively. As such, the light from the back face 110b of the body 110 can directly reach the camera lens 112 so that the camera lens 112 can shoot a view of the back face 110b of the body 11. At the same time, the view to be shot may be observed via the opening 121a and the window 113 thereby allowing selection of the view.

Figure 7:
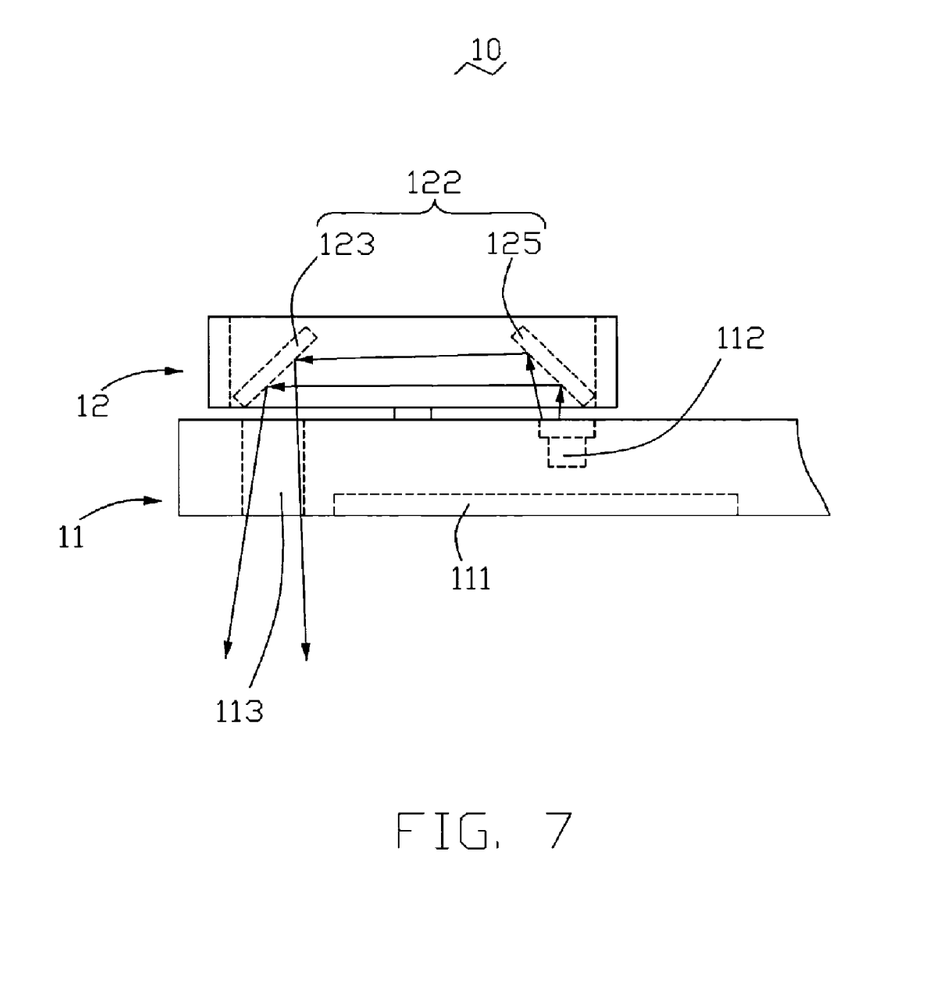
FIG. 7 is similar to FIG. 6, but showing the camera module in a second shooting mode.

FIG. 7 illustrates the camera module 10 in the second shooting mode. The second shooting mode indicates a mode for shooting view on the front of the display screen 111, for example, the user of the camera module 10, generally facing to the display screen 111. In the illustrated embodiment, the two openings 121a and 121b and the two reflectors 123 and 125 are disposed at four symmetrical positions in the turn member 12. Thus, the camera module 10 can shift shooting modes between the first and second modes by turning the turn member 12 at an angle of about 90°.

In the second shooting mode, the two reflectors 123 and 125 face toward the window 113 and the camera lens 112, respectively. The reflective surface 123a faces toward the window 113, and the reflective surface 125a faces toward the camera lens 112. As such, the light from the front of the display screen 111 can pass through the window 113 to the reflection mechanism 122 and then be reflected to the camera lens 112 via the reflection mechanism 122. In detail the light passing through the window 113 may be reflected by the reflective surface 123a first, reflected by the reflective surface 125a after that and then transmit to the camera lens 112. Accordingly, the camera module 10 can capture images of objects to the front of the display screen 111 due to the help of the window 113 and the reflection mechanism 122, i.e., the two reflectors 123 and 125. As a result, the user of the camera module 10, as though located at the front of the display screen 111 without facing toward the camera lens 112, can freely shoot an image of himself/herself and can synchronously and readily view the image displayed in the display screen 111.

In other embodiments, the camera module 10 can have other alternative configurations. For example, the body 11 could only define the opening 121b without defining the opening 121a (see FIG. 6). In this construction, for achieving the first shooting mode, the user can turn the turn member 12 to a position where the opening 121b is coaxially aligned with the camera lens 112. During shooting, the user can readily observe the real view on the front of the camera lens 112 and simultaneity view the image displayed in the display screen 111. The rotation shaft 124 could be firmly secured to the body 111 of the camera module 10 and be rotatably screwed to the turn member 12. The turn member 12 may comprise only the reflection mechanism 122 without the base 120.

The camera module 10 provides a simply mechanism for the user to readily photograph view on the front and back sides of the body 11 by turning the turn member 12. This simplicity mechanism of the camera module 10 effectively decreases technology complexity and cost for manufacturing it.

Moreover, the camera module of above-described embodiments may be implemented into various products. For example, the camera module may be employed in digital cameras or electronic devices such as portable mobile phones or personal digital assistants.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A camera module comprising:
    a body having a front face and a back face opposite to the front face;
    a display screen disposed on the front face of the body;
    a camera lens provided on the back face of the body;
    a through window defined in the body and communicating the front and the back faces; and
    a turn member rotatably mounted on the back face of the body, the turn member comprising a reflection mechanism, the reflection mechanism having two reflective surfaces being configured for cooperatively reflecting light incident from the window onto the camera lens while the turn member is turned to cause the reflection mechanism to face toward the window in such a manner that one of the reflective surfaces faces toward the window and the other reflective surface faces toward the camera lens.

2. The camera module as claimed in claim 1, wherein the two reflective surfaces are orientated in a manner such that light incident through the window is reflected from one of the reflective surfaces to the other, each of the two reflective surfaces being inclined to the back face of the body at a predetermined angle.

3. The camera module as claimed in claim 1, wherein the turn member comprises two elongated side surfaces, a distance between the two elongated side surfaces being smaller than a closest distance between the window and the camera lens.

4. The camera module as claimed in claim 1, wherein the turn member defines at least one opening coaxially aligned with the camera lens while the turn member is turned to cause the opening to face toward the camera lens.

5. The camera module as claimed in claim 4, wherein the at least one opening comprises two openings, the two openings being coaxially aligned with the camera lens and the window while the turn member is turned to cause the two openings to face toward the camera lens and the window respectively.

6. The camera module as claimed in claim 5, wherein cross-sectional dimensions of the two openings are not smaller than any corresponding cross-sectional dimensions of the camera lens and the window, respectively.

7. The camera module as claimed in claim 1, further comprising a rotation shaft rotatably connecting the turn member to the body.

8. The camera module as claimed in claim 7, wherein the rotation shaft is disposed at a center of an imaginary connecting line between the window and the camera lens.

9. An electronic device comprising:
    a body having a front face and a back face opposite to the front face;
    a display screen disposed on the front face of the body;
    a camera lens provided on the back face of the body;
    a through window defined in the body; and
    a reflection mechanism rotatably mounted to the body, the reflection mechanism having two reflective surfaces being configured for cooperatively reflecting light incident from the window onto the camera lens while the turn member is turned to cause the reflection mechanism to face toward the window in such a manner that one of the reflective surfaces faces toward the window and the other reflective surface faces toward the camera lens.

10. The electronic device as claimed in claim 9, wherein the two reflective surfaces are orientated in a manner such that light incident through the window is reflected from one of the reflective surfaces to the other, each of the two reflective surfaces being inclined to the back face of the body at a predetermined angle.

11. The electronic device as claimed in claim 9, wherein the reflection mechanism comprises two elongated side surfaces, a distance between the two elongated side surfaces being smaller than a closest distance between the window and the camera lens.

12. A camera module comprising:
    a body having a front surface and a rear surface at opposite sides thereof, and defining a through window extending through the front and rear surfaces;
    a display screen disposed at the front surface;
    a camera lens disposed in the rear surface; and
    a turn member rotatably mounted to the body and being rotatable with respective to the body between a first position and a second position, the turn member comprising a reflection mechanism with two reflective surfaces being configured for cooperatively reflecting light incident from the front side of the body to the camera lens when the turn member is at the first position in such a manner that one of the reflective surfaces faces toward the window and the other reflective surface faces toward the camera lens, wherein in the first position the camera module is capable of shooting views located at the front side of the body via the reflection mechanism and the camera lens, and in the second position the camera module is capable of shooting views located at the rear side of the body via the camera lens.

13. The camera module as claimed in claim 12, wherein the turn member is screwed to the body via a shaft having outer threads cooperating with a hole having inner threads.

14. The camera module as claimed in claim 12, wherein the two reflective surfaces are aligned with the window and the camera lens respectively when the turn member is at the first position.

15. The camera module as claimed in claim 12, wherein the two reflective surfaces are not aligned with the window and the camera lens, respectively, when the turn member is at the second position.

16. The camera module as claimed in claim 12, wherein the two reflective surfaces are opposite to each other and are inclined to the rear surface of the body such that light incident from the front side via the window is reflected from one of the reflective surfaces to the other.

17. The camera module as claimed in claim 16, wherein the reflection mechanism comprises two reflectors, and the two reflective surfaces are defined on the two reflectors respectively.

18. The camera module as claimed in claim 16, wherein the reflection mechanism comprises one of a prism defining the two reflective surfaces and a frustum of a prism defining the two reflective surfaces.

19. The camera module as claimed in claim 16, wherein the two reflective surfaces are perpendicular to each other.

20. The camera module as claimed in claim 12, wherein the turn member further comprises a rotation shaft rotatably connecting the turn member to the body, and the rotation shaft is disposed at a center of an imaginary connecting line between the window and the camera lens.

* * * * *

UNITED STATES PATENT AND TRADEMARK OFFICE
CERTIFICATE OF CORRECTION

PATENT NO. : 7,585,121 B2
APPLICATION NO. : 11/309462
DATED : September 8, 2009
INVENTOR(S) : Kun-Jung Tsai Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 371 days.

Signed and Sealed this

Fourteenth Day of September, 2010

David J. Kappos
*Director of the United States Patent and Trademark Office*